US005223327A

United States Patent [19]

Bihy et al.

[11] Patent Number: 5,223,327

[45] Date of Patent: Jun. 29, 1993

[54] ELECTRICALLY CONDUCTIVE SURFACE ELEMENT FOR FORMING AN ELECTROMAGNETIC WAVE ABSORBER

[75] Inventors: Lothar Bihy, Kaiserslautern; Thomas Gaisbauer, Ladenburg, both of Fed. Rep. of Germany

[73] Assignee: Isover Saint-Gobain, Courbevoie, France

[21] Appl. No.: 695,909

[22] Filed: May 6, 1991

[30] Foreign Application Priority Data

May 6, 1990 [DE] Fed. Rep. of Germany ....... 4014453

[51] Int. Cl.[5] .................................................. B32B 3/00

[52] U.S. Cl. .............................. 428/195; 174/35 MS; 427/256; 428/244; 428/283; 428/284; 428/285; 428/920; 428/921

[58] Field of Search ............... 428/240, 245, 281, 283, 428/285, 286, 289, 290, 920, 921, 195, 206, 209, 210, 408, 284, 244; 174/35 MS, 35 R, 36; 342/1; 156/291; 427/256, 282

[56] References Cited

U.S. PATENT DOCUMENTS

| | | | |
|---|---|---|---|
| 4,233,882 | 11/1980 | Eichweber | 89/1 L |
| 4,305,985 | 12/1981 | Heublein | 428/87 |
| 4,347,284 | 8/1982 | Tsutomu et al. | 428/328 |
| 4,435,465 | 3/1984 | Ebneth et al. | 428/244 |
| 4,606,848 | 8/1986 | Bond | 252/511 |
| 4,645,704 | 2/1987 | Hellwig | 428/285 |
| 4,647,495 | 3/1987 | Kanayama et al. | 428/285 |
| 4,784,899 | 11/1988 | Ono et al. | 428/236 |
| 4,921,751 | 5/1990 | Wakahara et al. | 428/229 |
| 4,935,281 | 6/1990 | Tolbert et al. | 428/285 |
| 4,940,619 | 7/1990 | Smith et al. | 428/285 |
| 4,965,408 | 10/1990 | Chapman et al. | 174/35 MS |
| 5,035,942 | 7/1991 | Nagata et al. | 428/408 |
| 5,094,907 | 3/1992 | Yamamura et al. | 428/284 |
| 5,155,316 | 10/1992 | Chiu | 428/244 |
| 5,155,319 | 10/1992 | Chui | 428/244 |
| 5,160,787 | 11/1992 | Gaku et al. | 428/285 |
| 5,164,242 | 11/1992 | Webster et al. | 428/198 |

*Primary Examiner*—James J. Bell

*Attorney, Agent, or Firm*—Oblon, Spivak, McClelland, Maier & Neustadt

[57] ABSTRACT

An electrically conductive surface element, for use in the construction of external facades, is provided with a flame-retardant substance in addition to a radar-absorbing supporting element with electromagnetically active conductive material which has preferably been applied by a printing process.

12 Claims, 1 Drawing Sheet

ELECTRICALLY CONDUCTIVE SURFACE ELEMENT FOR FORMING AN ELECTROMAGNETIC WAVE ABSORBER

BACKGROUND OF THE INVENTION

1. Field of the Invention

The invention generally relates to an electromagnetic wave absorber and, more particularly, to an electrically conductive surface element incorporated in a non-combustible absorber of electromagnetic radiation and to a process for producing an electrically conductive surface element of this type.

2. Background Discussion

In the case of existing flight safety systems, very short-wave electromagnetic waves, in particular radar waves, are used to locate and identify aircraft. This is true of both civilian and military air traffic. Flight safety systems of this type are impaired by the reflection of radar waves, particularly, for example, from external facades of buildings in the vicinity of airports, because the reflection of these radar waves can lead to considerable interference in the ability of such flight safety systems, using radar, to locate aircraft.

Although provision can be made, on the ground, for filtering out the effects of unwanted reflected radar waves using specific technical devices, this is hardly practicable on an aircraft due to the lack of space and weight restrictions. For this reason, it is very important that the reflection of electromagnetic waves, in particular radar waves, at external facades of buildings in the vicinity of airports, be eliminated to a large extent.

In order to solve this problem, it has already been suggested that radar absorbers, in the form of a surface element which absorbs radar waves, should be used in the construction of the external facade of buildings in the vicinity of airports. Such surface elements typically comprise panel sections or layers, made from mineral wool, and panel sections or layers, made from an electrically conductive material, these different layers of material being arranged in an alternating fashion in the manner of a lamellar structure. The lamellar structure is placed into a cassette-type frame and secured to the building by the frame to form the radar absorber.

However, in practice, such radar absorbers cause considerable difficulties since adherence to critical or optimum values for absorption is important for an absorber of this type to achieve a sufficient level of reflection or absorption with regard to the radar waves. Thus, in the case of radar absorbers of the multi-layer lamellar structure described above, the reflection or absorption level does not only depend on the relative distances between the panels of mineral wool and the electrically conductive layers, which distances are adapted to the particular type of radar waves to be absorbed, but also on the amount and distribution of an electromagnetically active material, embedded in the intermediate layers between the mineral wool panels, which is responsible for providing the conductivity of these electrically conductive intermediate layers.

Obtaining a good absorption level depends mainly on adherence to very narrow application tolerances during the embedding of the electromagnetically active conductive material in the intermediate layers between the mineral wool layers. However, these application tolerances are difficult to produce to industrial standard sizes using materials of this type.

Furthermore, both the embedding of the electromagnetically active conductive material, which is mainly responsible for the radar-absorbing properties of the layered structure, and the use of binders for the layered structure, lead to the multi-layer systems of this type being combustible. As a consequence, such absorbers can no longer be included in construction materials class A according to DIN 4102.

SUMMARY OF THE INVENTION

An object of the invention is to produce an electrically conductive surface element for forming a part of a non-combustible absorber having good absorbing properties with respect to electromagnetic waves, in particular radar waves.

The cost-effective production of a surface element of this type is a further object of the invention.

These and other objects are achieved, according to preferred embodiments of the present invention, by an electrically conductive surface element, for use in forming an absorber of electromagnetic waves, comprising a supporting structure made of a non-woven fabric having a flame- retardant substance wherein an electromagnetically active conductive material is applied to the electrically conductive surface element by a printing process.

As a result of the additional embedding of a flame-retarding substance in the supporting structure, the electrically conductive surface element is advantageously characterized by its non-combustibility. As a result, absorbers constructed using such a surface element conform to group A of construction materials according to DIN 4102 as regards combustion behavior.

In particular, this additional flame retardant substance counteracts a deterioration in combustion behavior of the absorber which results from the use of the combustible electromagnetically active conductive materials incorporated the electrically conductive surface element and from the use of binders during the construction of the absorber which comprises a multi-layer lamellar of alternating mineral wool strips and intermediate layers made from the electrically conductive surface element.

The absorption capacity can simultaneously be improved in that the addition of the electromagnetically active conductive materials, which decide the absorption level and which are, as a rule, combustible, is no longer limited by their inherent deterioration in combustion behavior. Instead, the addition of electromagnetically active conductive materials can be carried out taking into account only the optimum absorption level.

The application of electromagnetically active conductive material by a printing process is a particular advantageous feature of the present invention since it enables the industrial manufacture of a radar-absorbing surface element. having a conductive material with narrow application tolerances.

To the applicants' knowledge, applying the electromagnetically active conductive material by impregnating, painting, smoothing on or injection, on an industrial scale, does not produce the durable, good embedding and distribution of the material within the supporting structure or the radar-absorbing surface element which is required to the give the narrow tolerances needed to achieve a good absorption level.

However, according to preferred embodiments of the invention, the printing procedure is only possible because the deterioration in combustion behavior, inevitably resulting from the use of printing ink containing organic substances, is counteracted by the addition of a flame-retardant substance. In this respect, these features of the present invention result in a synergistic effect in that, owing to the flame-retardant substance which improves the combustion behavior of the absorber, a simultaneous improvement of the absorption capacity is rendered possible by adherence to narrow application tolerances, owing to the application of the electromagnetically active conductive material according to the printing technique.

The adherence to very narrow application tolerances for the electromagnetically active conductive material, which is decisive for the optimum absorption performance, being in the range of about 9-9 g/m$^2$, preferably about 10-12 m$^2$, results from the application of this conductive material preferably .according to the silk screen printing process. In this respect the material is applied to the supporting structure of the conductive surface element, in particular in an ink dispersion, which has been enriched with the conductive material. Soot and graphite are particularly suited for use as the electromagnetically active conductive material.

With regard to the layered construction of the absorber of the multi-layered type, it is particularly useful for the supporting structure of the electrically conductive surface element incorporated in the absorber to be formed of a non-woven fabric, in particular a glass-fiber, non-woven fabric. Thus, the alternating layers of mineral wool strips and glass fiber layers are secured to a flat support by, for example, adhesives in order to form a lamellar mat.

It is advantageous, with regard to the combustion behavior of the surface element, to use, as the flame-retardant substance, a material having a texture which will alter endothermically before reaching a maximum permitted temperature. Materials which retain a high water content are particularly suited to this end. In the event of fire, the retained water content is released and converted into steam when critical temperatures are reached, thus bringing about a significant delaying effect, the timing of which may be precisely determined by the amount of retained water. Aluminum hydroxide, which is advantageously used with a binder content of less than of about 5% in relation to the dry mass, is particularly suited as a retaining substance. Further examples of retaining substances are hydrous aluminum oxide, hydrous sodium metasilicate or sodium sulphate decahydrate.

Advantageously, for the production of the surface element, the supporting structure thereof, i.e., in particular, the glass-fiber, non-woven fabric, is coated or impregnated with the flame-retardant substance prior to the application of the electromagnetically active conductive material, wherein these inorganic substances are applied in relatively large amounts in a separate working process.

Only when the glass-fiber, non-woven fabric has been coated with the flame-retardant substance is dispersion ink advantageously applied to the electrically conductive surface element by, for example, a silk-screen printing process, which results in a very good distribution of the conductive material on the surface element. The conductive material, i.e., in particular soot or graphite, is applied to the glass-fiber, non-woven fabric in amounts of about 9-6 g/m$^2$, advantageously in amounts of about 10-12 g/m$^2$. This enables an optimum radar absorption level of the surface element to be achieved.

DETAILED DESCRIPTION OF THE PREFERRED EMBODIMENT

Below, an example of an embodiment according to the invention is given in purely schematic form, with reference to FIGS. 1 and 2.

Figure 1:
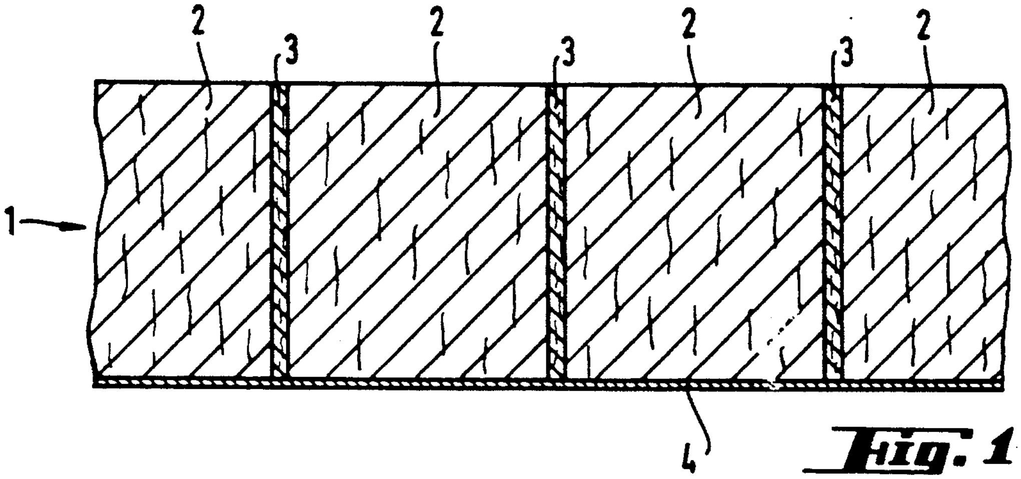
FIG. 1 shows the structure of an absorber of the multi-layer system type according to one embodiment of the present invention.

FIG. 1 illustrates a lamellar structure, generally indicated at 1, formed as a mat with a layered structure comprising alternating layers 2 of mineral wool and narrower strips 3 of an electrically conductive surface element provided to form a radar-absorbing multi-layer system. The alternating layers 2 and strips 3 may be secured to the facade of a building individually by, for example, adhesives, dowelling, clamping or other similar attachment arrangements. In the present embodiment, however, layers 2 and strips 3 are arranged on a substrate 4, which comprises, for example, a reinforced aluminum foil.

For the construction of an external facade, the lamellar structure 1 is arranged in a cassette-type frame, which is not shown, which serves to secure the lamellar structure 1 to the building. Additionally, on the outside, covering the lamellar structure 1 is secured an external plate (not shown) of, for example, glass, plastic material or other suitable material.

Electromagnetic waves which impinge on the external plate usually pass therethrough in a substantially reflection-free manner and are, to a large extent, absorbed inside the lamellar structure 1, thus bringing about the desired low level of reflection from the external facade.

The reflection absorption of the external facade depends particularly on the strips 3 comprising the electrically conductive surface element of the present invention. In an advantageous embodiment of the present invention, the strips 3 are constructed from a glass-fiber, non-woven fabric which forms a supporting structure or body thereof, in which an electromagnetically active conductive material and a flame-retardant substance are embedded.

Although the material used to form the supporting structure of the conductive surface element forming the strips 3 is preferably a glass fiber, non-woven fabric, other non-woven fabrics or other materials, such as a foil, may be used. The material that is used as the electromagnetically active conductive material is preferably soot or graphite or other, electrically conductive and, most importantly, dispersible materials.

In the case of the lamellar structure 1, the distance between two narrow strips 3, in relation to the wavelength of the electromagnetic waves to be absorbed, in particular radar waves, is arranged so that there is an absorption, in particular a resonance absorption, of the waves that are irradiated. An important factor for radar absorption at the desired level is the embedding of a very precise amount of evenly distributed electromagnetically active conductive material, in particular soot, in the supporting structure or body forming the strips 3.

An even embedding of the electromagnetically active conductive material, together with a very precise application tolerance, according to preferred embodiments of the present invention, is achieved by a printing process. A quick-bonding dispersion ink, which has been enriched with the electromagnetically active conductive material, for example soot, is used as the printing ink for this process.

Silk-screen printing is particularly suited for achieving the required narrow application tolerances, a printing ink suited to this type of printing process typically containing organic substances such as emulsifiers, binders and fillers. Thus, the printing process results in a relatively high and even organic enrichment of the conductive surface element of the present invention. Although the use of such a conductive surface element provides high absorption performance, its use can simultaneously lead to a deterioration in combustion behavior.

This is counteracted, according to preferred embodiments of the present invention, in that, in an additional processing step, preferably conducted before the application of the electromagnetically active conductive material, a flame-retardant substance is applied in such an amount so as to completely enclose and coat the non-woven fabric acting as the supporting structure of the electrically conductive surface element forming strips 3. This improves the combustion behavior. Aluminum hydroxide with an extremely low binder content, which is advantageously less than about five weight per cent of the dry mass, is suited for use as the substance.

Aluminum hydroxide has a storage mass with a high stored water content which is released if there is a fire. Hydrous aluminum oxide, hydrous sodium metasilicate or sodium sulphate decahydrate can also be used as materials with a high stored water content.

After the coating of the supporting structure, i.e., the glass-fiber, non-woven fabric, with the flame-retardant substance, the dispersion ink, containing soot, is applied in a further coating process preferably by a silk-screen printing process with low application amount tolerances, which results advantageously in a low amount of soot being used.

In one embodiment, the dispersion ink fluid comprise about 70% water and about 30% solid comprising about 5% soot, about 5% disperser, and about 20% binder in addition to filler, chalk having been selected as the filler. An excellent radar-absorption level, constant across the entire surface of the conductive surface element, can thereby be achieved.

Figure 2:
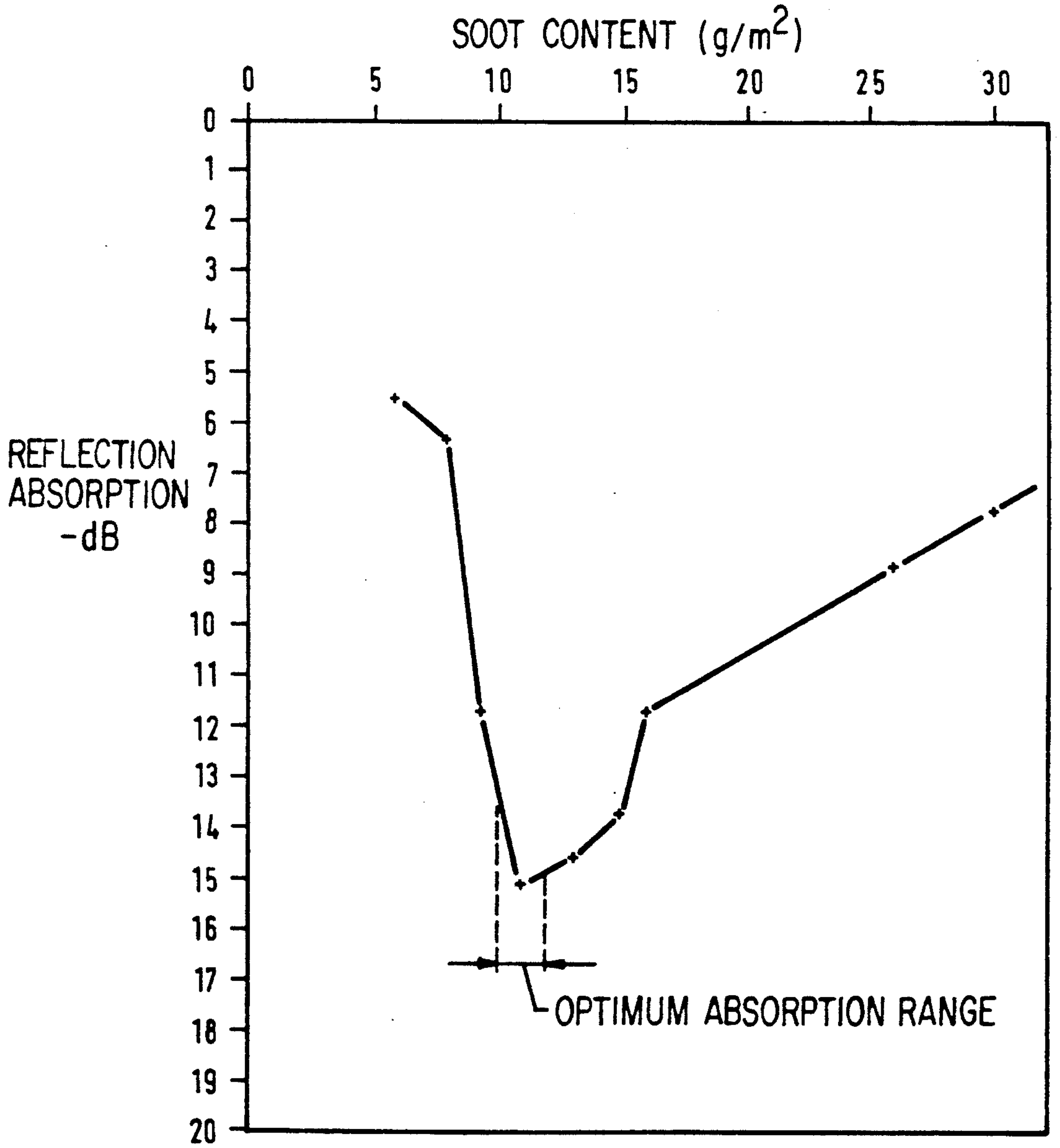
FIG. 2 shows a diagram of the reflection absorption in relation to the amount of conductive material used, which in this case is soot, as an example of a specific matrix.

The diagram in FIG. 2 shows the reflection absorption of microwaves at 600 Mhz as a function of the amount of soot introduced into a precoated glass-fiber, non-woven fabric with a surface-related mass of 60 $g/m^2$. This diagram shows very clearly that a very good reflection absorption of $-11.5$ to $-15$ Db can be achieved on surface elements with a surface amount of soot of about 9–16 $g/m^2$, while the optimum range for the surface amount is about 10–12 $g/m^2$ wherein there is a direct correlation between the reflection absorption measured in a tubular conductor for each surface element and the desired reflection absorption for a facade element in the case of usual radar frequencies of 1.03–1.09 GHz. In this case a reflection application of $-13.5$ to $-15$ Db could be achieved.

Narrow surface application tolerances are thus achieved by the application of the electromagnetically active conductive material, which may be soot, by a printing process, wherein a dispersion ink with organic substances (emulsifiers and binders) is used for the printing technique. Because of a precoating of the glass-fiber nonwoven fabric with a storage mass, which releases water in the event of a fire, positive properties with regard to non-combustibility may be achieved for the electrically conductive surface element of the present invention, so that a layer structure produced using this element conforms to the construction materials class A according to DIN 4102.

The special effect achieved by the above described measures according to the invention can be physically distinguished as a combined interference and absorption effect for electromagnetic waves, but can essentially be traced back to the purpose-specific embedding of the soot particles in the particles of the dispersion ink and the conductivity structure which this introduces, wherein the silk-screen printing process provides an very even and economic distribution of the soot particles in connection with the dispersion ink on the glass-fiber, non-woven fabric. This produces a layer of soot with very narrow application tolerances and thus an optimum reflection absorption. An advantage in this is the fact that the conductive surface element with certain absorption properties may be reproduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. An electrically conductive surface element forming a part of an absorber of electromagnetic waves intended for use application to an external facade of a building, the element comprising:

a supporting structure forming a body of the element, the supporting structure comprising a non-woven fabric coated with a flame-retardant substance; and an electromagnetically active conductive material printed on the supporting structure coated with a flame-retardant substance.

2. A surface element according to claim 1, wherein the electromagnetically active conductive material is a silkscreen ink including one of soot and graphite.

3. A surface element according to claims 1 or 2, wherein the electromagnetically active conductive material includes a dispersion material capable of adhesion.

4. A surface element according to claim 3, wherein the dispersion material includes at least one of emulsifiers, binders and fillers.

5. A surface element according claim 1, wherein the non-woven fabric of the supporting structure is glass-fiber, non-woven fabric.

6. A surface element according to claim 1, wherein the flame-retardant material coating the supporting structure has a structure which alters before a maximum permitted temperature is reached.

7. A surface element according to claim 6, wherein the flame-retardant substance is a retaining substance with a high stored water content.

8. A surface element according to claim 7, wherein the flame retardant substance is one from the group consisting of of aluminum hydroxide, hydrous aluminum oxide, hydrous sodium metasilicate and sodium sulphate decahydrate.

9. A surface element according to claim 8, wherein the flame-retardant substance has a low binder content of about 5% in relation to a dry mass thereof.

10. A surface element according to claim 1, wherein electromagnetically active conductive material contains soot a ratio of about 9–16 g/m$^2$.

11. A surface element according to claim 1, wherein electromagnetically active conductive material contains soot a ratio of about 10–12 g/m$^2$.

12. An absorber for electromagnetic waves for application to an external facade of a building, comprising a lamellar structure formed of alternating layers of mineral wool and electrically conductive surface elements, said surface elements being narrower than said layers of mineral wool and each comprising:

a supporting structure forming a body of the element, the supporting structure comprising a non-woven fabric coated with a flame-retardant substance; and an electromagnetically active conductive material printed on the supporting structure coated with a flame-retardant substance.

* * * * *